Figure 1:
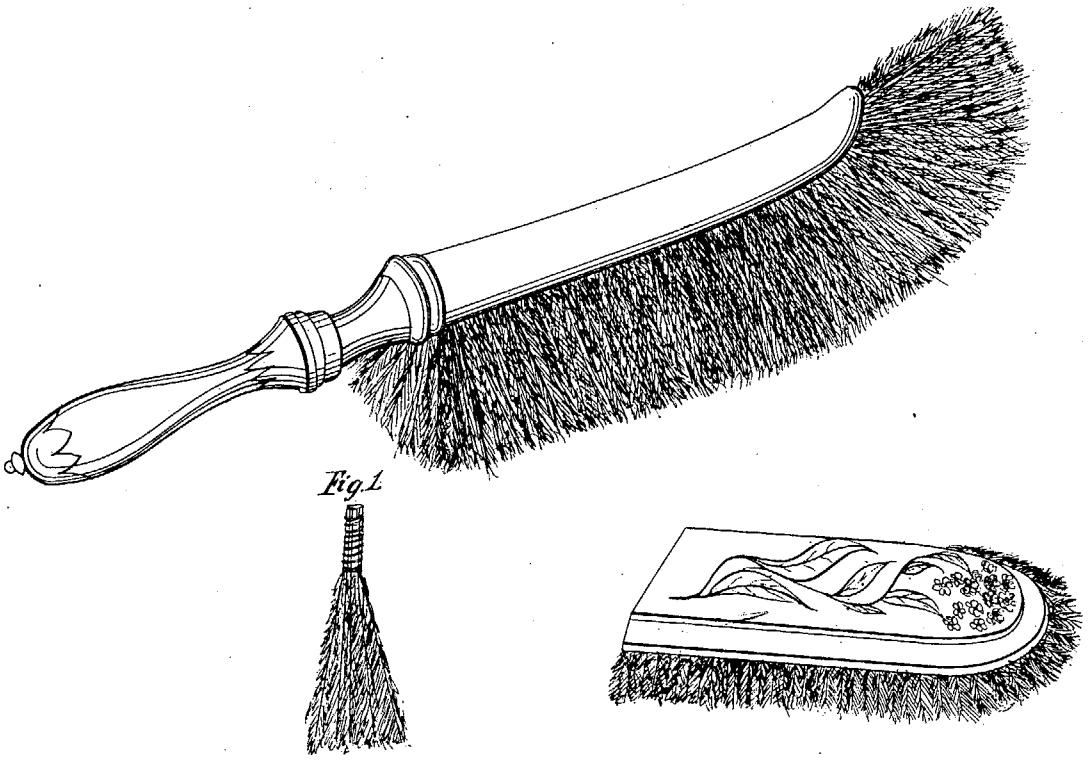

9036X

W. Steele,

Brush,

Patented Aug. 17, 1835.

N. PETERS, PHOTO-LITHOGRAPHER, WASHINGTON, D. C.

Aug. 17 1835 av. 15

William Steele.

Letters Patent.

The schedule referred to in these Letters Patent and making part of the same containing a description in the words of the said William Steele himself of his improvement - In the art of making Brushes This applicant prepares the stocks, blocks, or handles of brushes in the same manner as the same are prepared for bristles whether for set work or drawn work, as known in the trade, and having selected feathers of the length desired according to the use intended, he prepares them with pitch, glue, cement, or other adhesive substance in like manner as bristles are prepared for setting and securing the feathers together at their quill ends by such adhesive substance and pack thread say from two, three to twenty or any greater convenient number, they are set in holes made in the stock, block, or handle of the proper size in like manner as brushes of bristle are set and as occasion may require the quill ends may be cut away so as to be more conveniently set. So that when drawn the feathers at the quill end may be bent double say 1/8 to 1/4 of an inch from the point of the quill and then being taken into the wire loop drawn into its place. - This may be done with any number of feathers at the same time as with bristles. the feathers also may be drawn in by doubling them in the middle or at one third or less from the quill end so as to make the point of the quill operate where such operation may be wanted, and the point of the quills may be split if the operation of a hard bristle is desired in combination with that of the softer end of the feather. It is obvious that brushes constructed of feathers as these will hold water better or longer and in greater quantity than bristles and the action of them will be. ~~will be~~ more like a towel at the same time it will operate also as bristles do, thus of uniting the operations of scraping and wiping where these are needed or of wiping alone where this is needed according to the fineness and length of the feathers, the principle of this improvement consists in the construction of brushes with feathers instead of bristles, the feathers being of convenient size and ~~and~~ length according to the use intended substantially as aforesaid. This applicant claiming the exclusive right to the mode of constructing brushes of feathers for the following uses viz: for dusting brushes of all kinds, hearth brushes and water brushes and hair brushes of all kinds. This applicant contemplating the application of the principle of this improvement to the construction of all kinds of brushes which may be made of feathers instead of bristles, that is to say which may be made by setting and by drawing as aforesaid, this applicant not claiming the manufacture of brushes with feathers in any other mode but only in this substantially as above described Witnesses
H. M'Elhoeffer
Samuel N. Richards William Steele 555 wds Ex.
Chfw